US012752754B2

(12) United States Patent
Sakaguchi et al.

(10) Patent No.: US 12,752,754 B2
(45) Date of Patent: Oct. 6, 2026

(54) VEHICLE BRAKING CONTROL DEVICE

(71) Applicant: ADVICS CO., LTD., Kariya (JP)

(72) Inventors: Kohei Sakaguchi, Kariya (JP); Shota Tanzan, Kariya (JP); Atsushi Ikematsu, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 18/992,032

(22) PCT Filed: Jul. 20, 2023

(86) PCT No.: PCT/JP2023/026670
§ 371 (c)(1),
(2) Date: Jan. 7, 2025

(87) PCT Pub. No.: WO2024/024640
PCT Pub. Date: Feb. 1, 2024

(65) Prior Publication Data

US 2026/0001517 A1 Jan. 1, 2026

(30) Foreign Application Priority Data

Jul. 25, 2022 (JP) ................................ 2022-117721

(51) Int. Cl.
*B60T 8/1761* (2006.01)
*B60T 8/1764* (2006.01)

(52) U.S. Cl.
CPC ........ *B60T 8/17616* (2013.01); *B60T 8/1764* (2013.01)

(58) Field of Classification Search
CPC ........................... B60T 8/17616; B60T 8/1764
See application file for complete search history.

(56) References Cited

U.S. PATENT DOCUMENTS 5,315,518 A * 5/1994 Lin ...................... B60T 8/1764 701/73
6,132,014 A 10/2000 Kiso et al.
(Continued)

FOREIGN PATENT DOCUMENTS

DE 698 36 934 T2 10/2007
DE 11 2011 103 701 T5 8/2013
(Continued)

OTHER PUBLICATIONS

International Search Report issued Oct. 10, 2023 in PCT/JP2023/026670, filed on Jul. 20, 2023 , 4 pages (with English Translation).

*Primary Examiner* — George C Jin
(74) *Attorney, Agent, or Firm* — Oblon, McClelland, Maier & Neustadt, L.L.P.

(57) ABSTRACT

A control device 50 includes a control unit M19 that implements an ABS control for suppressing both the left and right wheels of a vehicle from being locked by adjusting the braking forces of both the left and right wheels. In the ABS control, the control unit M19 executes a cross processing of alternately switching between a right-wheel period in which the right wheel, of the left and right wheels, is the first wheel for increasing the braking force and the left wheel is the second wheel for adjusting the braking force in a range of less than the braking force of the first wheel, and a left-wheel period in which the left wheel is the first wheel and the right wheel is the second wheel, and executes a cross processing of increasing the braking force of the second wheel in both the left-wheel period and the right-wheel period.

7 Claims, 5 Drawing Sheets

(56) References Cited

U.S. PATENT DOCUMENTS

| | | | | |
|---|---|---|---|---|
| 2005/0080532 | A1* | 4/2005 | Kato | B62D 6/003 180/443 |
| 2006/0055234 | A1* | 3/2006 | Choi | B60T 8/17616 303/113.1 |
| 2012/0253602 | A1* | 10/2012 | Fujita | B60T 8/1755 701/41 |
| 2013/0226429 | A1* | 8/2013 | Udaka | B60T 8/17616 701/73 |
| 2014/0330501 | A1* | 11/2014 | Watanabe | B60T 8/1755 701/90 |
| 2022/0089133 | A1* | 3/2022 | Lin | B60T 8/172 |

FOREIGN PATENT DOCUMENTS

| | | | |
|---|---|---|---|
| JP | 2008-37179 | A | 2/2008 |
| JP | 2008-126859 | A | 6/2008 |
| JP | 2016-101025 | A | 5/2016 |

* cited by examiner

VEHICLE BRAKING CONTROL DEVICE

TECHNICAL FIELD

The present disclosure relates to a vehicle braking control device that performs an anti-lock brake control for adjusting braking force of both the left and right wheels of a vehicle.

BACKGROUND ART

Patent Literature 1 discloses a control device that performs an anti-lock brake control for stabilizing a vehicle behavior by suppressing the wheels of the vehicle from locking. The control device performs a select-low anti-lock brake control based on a wheel having a lower wheel speed among both the left and right wheels.

CITATIONS LIST

Patent Literature

Patent Literature 1: JP 2008-126859 A

BRIEF SUMMARY

Technical Problems

When the control device performs the select-low anti-lock brake control, the braking force of both the left and right wheels is set to a magnitude corresponding to the wheel having the lower wheel speed, and thus there is a possibility that more braking force than necessary is applied to both wheels. In this case, the braking efficiency may decrease.

Solutions to Problems

A vehicle braking control device for solving the above problem includes a control unit that implements an anti-lock brake control for suppressing both the left and right wheels of a vehicle from being locked by adjusting braking forces of both the left and right wheels. In the anti-lock brake control, the control unit executes a cross processing of alternately switching between a first period in which one of the left and right wheels is a first wheel for increasing a braking force and the other of the left and right wheels is a second wheel for adjusting the braking force in a range of less than the braking force of the first wheel and a second period in which the other wheel is the first wheel and the one wheel is the second wheel, and increasing the braking force of the second wheel in both the first period and the second period.

When the vehicle braking control device is executing the cross processing of the anti-lock brake control, there is a period in which both the braking force of the first wheel and the braking force of the second wheel are increased of the left and right wheels. However, in this period, a state in which the braking force of the second wheel is less than the braking force of the first wheel is maintained. Therefore, the degree of deceleration slip is less likely to increase in the second wheel than in the first wheel. That is, the second wheel is less likely to be locked as compared with the first wheel. Therefore, the braking efficiency can be suppressed from decreasing during the implementation of the anti-lock brake control.

DESCRIPTION OF EMBODIMENTS

Hereinafter, one embodiment of a vehicle braking control device will be described with reference to FIGS. 1 to 8.

Figure 1:
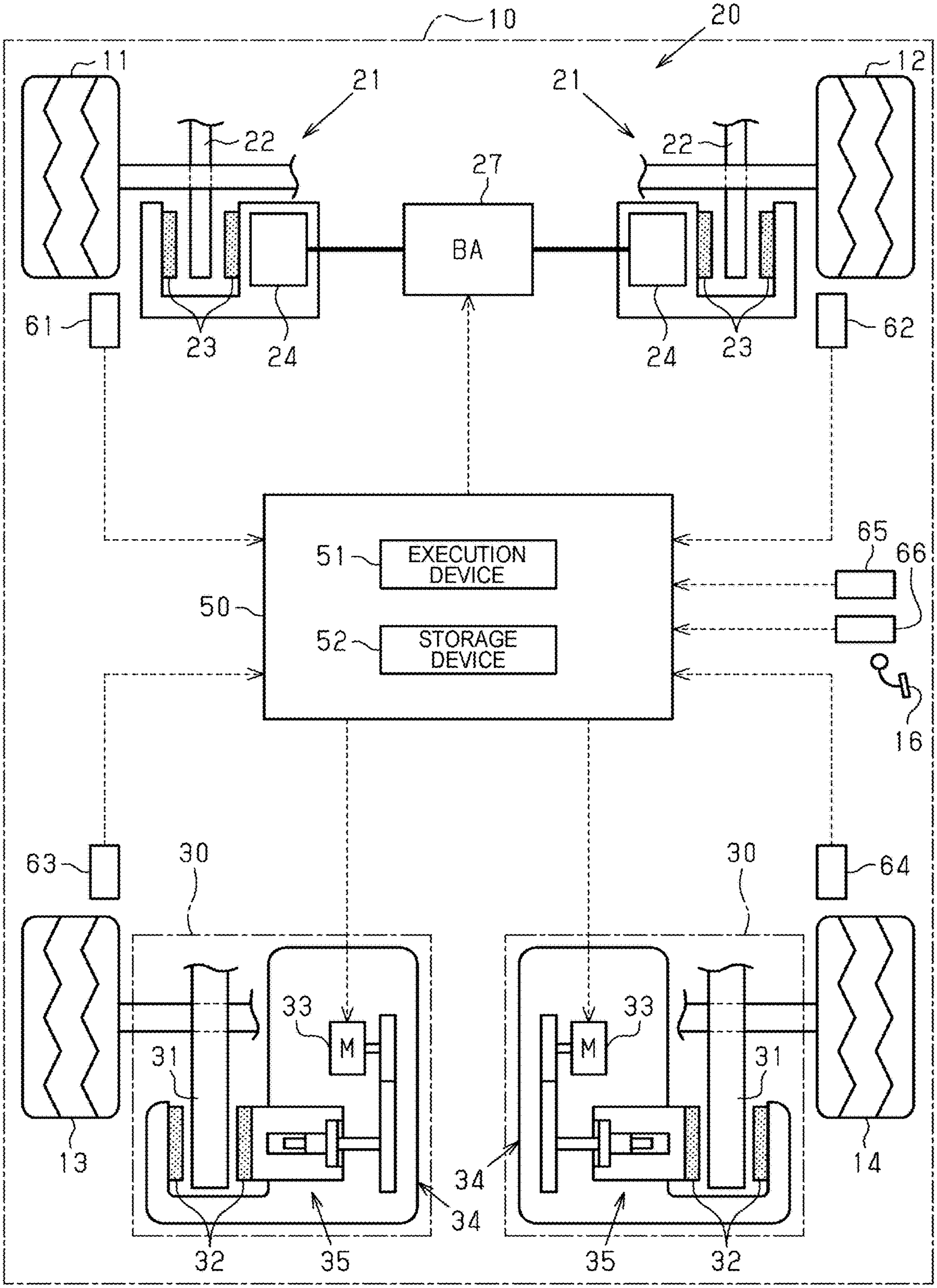
FIG. 1 is a configuration view illustrating an outline of a vehicle equipped with a control device serving as one embodiment of a vehicle braking control device.

As illustrated in FIG. 1, a vehicle 10 includes a plurality of wheels and a brake system that adjusts braking force to apply to the plurality of wheels. The plurality of wheels include a left front wheel 11, a right front wheel 12, a left rear wheel 13, and a right rear wheel 14. The brake system includes a front wheel braking device 20, two rear wheel braking devices 30, and a control device 50. In the present embodiment, the control device 50 corresponds to a "vehicle braking control device".

Front Wheel Braking Device

The front wheel braking device 20 includes two friction brakes 21 and a braking actuator 27. Among the plurality of friction brakes 21, one is provided for the left front wheel 11, while the remaining other one is provided for the right front wheel 12. Each of the plurality of friction brakes 21 includes a frictional portion 22, a friction portion 23, and a wheel cylinder 24. Since the frictional portion 22 rotates integrally with the front wheels 11 and 12, the friction brake 21 can apply the braking force to the front wheels 11 and 12 by pressing the friction portion 23 against the frictional portion 22. The power of pressing the friction portion 23 against the frictional portion 22 becomes larger the higher the hydraulic pressure in the wheel cylinder 24. That is, the friction brake 21 can adjust the braking force of the front wheels 11 and 12 by adjusting the hydraulic pressure in the wheel cylinder 24.

The braking actuator 27 is configured to be able to individually control the hydraulic pressure in the wheel cylinder 24 of the plurality of friction brakes 21. The braking actuator 27 adjusts the braking force of the front wheels 11 and 12 by controlling the hydraulic pressure in the wheel cylinder 24.

Rear Wheel Braking Device

Among the two rear wheel braking devices 30, one is provided for the left rear wheel 13, while the remaining other one is provided for the right rear wheel 14. Each of the plurality of rear wheel braking devices 30 includes a frictional portion 31, a friction portion 32, an electric motor 33, a deceleration mechanism 34, and a linear motion conversion mechanism 35. Since the frictional portion 31 rotates integrally with the rear wheels 13 and 14, the rear wheel braking device 30 can apply the braking force to the rear wheels 13 and 14 by pressing the friction portion 32 against the frictional portion 31.

The deceleration mechanism 34 decelerates the rotational motion of the electric motor 33 and outputs the decelerated rotational motion to the linear motion conversion mechanism 35. The linear motion conversion mechanism 35 converts the rotational motion input from the deceleration mechanism 34 into a linear motion and outputs the linear motion to the friction portion 32. Therefore, in the rear wheel braking device 30, when the electric motor 33 is driven, the output torque of the electric motor 33 is transmitted to the friction portion 32 via the deceleration mechanism 34 and the linear motion conversion mechanism 35. As a result, the friction portion 32 moves closer to the frictional portion 31 or the friction portion 32 moves away from the frictional portion 31. That is, the braking force of the rear wheels 13 and 14 increases by increasing the output torque of the electric motor 33.

Control Device

A signal is input from a detection system to the control device 50. The detection system includes four wheel speed sensors 61, 62, 63, and 64, a longitudinal acceleration sensor 65, and a brake sensor 66. The wheel speed sensor 61 to 64 outputs a signal corresponding to the rotation speed of the corresponding wheel 11 to 14. The longitudinal acceleration sensor 65 outputs a signal corresponding to the longitudinal acceleration of the vehicle 10. The brake sensor 66 outputs a signal corresponding to information on the operation of a brake pedal 16 by the driver of the vehicle 10. For example, the brake sensor 66 may be a sensor that detects the operation force of the brake pedal 16 by the driver or a force correlated with the operation force, or may be a sensor that detects the operation amount of the brake pedal 16. Then, the control device 50 controls the braking actuator 27 and the plurality of electric motors 33 based on signals input from various sensors.

Note that the rotation speed of the wheel based on the detection value of the wheel speed sensor 61~64 is referred to as "wheel speed VW". Specifically, the wheel speed VW of the left front wheel 11 is referred to as "wheel speed VW1", the wheel speed VW of the right front wheel 12 is referred to as "wheel speed VW2", the wheel speed VW of the left rear wheel 13 is referred to as "wheel speed VW3", and the wheel speed VW of the right rear wheel 14 is referred to as "wheel speed VW4". The longitudinal acceleration of the vehicle 10 based on the detection value of the longitudinal acceleration sensor 65 is referred to as "longitudinal acceleration GX".

The control device 50 performs an anti-lock brake control for suppressing the wheels from locking at the time of deceleration of the vehicle 10. Hereinafter, the anti-lock brake control is referred to as "ABS control". The control device 50 individually performs the ABS control for each wheel with respect to the front wheels 11 and 12. On the other hand, when determined that at least one rear wheel of both the left and right rear wheels 13 and 14 has a possibility of locking, the control device 50 implements the ABS control on both the left and right rear wheels 13 and 14.

The control device 50 includes an execution device 51 and a storage device 52. For example, the execution device 51 is a CPU. The storage device 52 stores a control program executed by the execution device 51.

Figure 2:
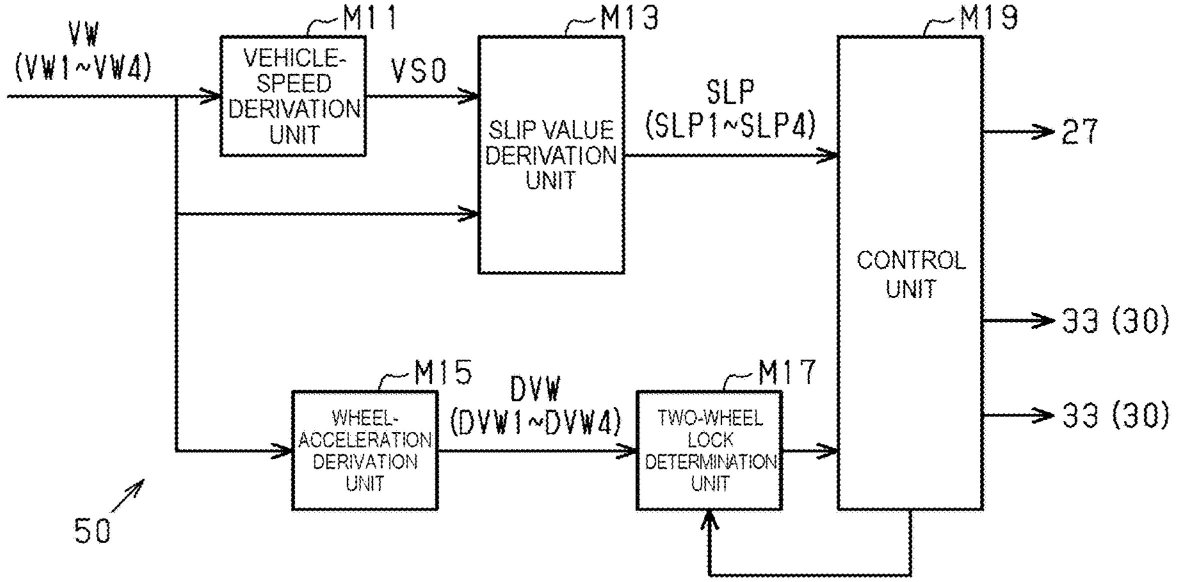
FIG. 2 is a block diagram illustrating a functional configuration of the control device.

As illustrated in FIG. 2, the execution device 51 executes the control program to function as a vehicle-speed derivation unit M11, a slip value derivation unit M13, a wheel-acceleration derivation unit M15, a two-wheel lock determination unit M17, and a control unit M19.

The vehicle-speed derivation unit M11 derives the vehicle speed VS0 of the vehicle 10 based on the wheel speeds VW1 to VW4 of the plurality of wheels 11 to 14. For example, at the time of braking of the vehicle 10, the vehicle-speed derivation unit M11 derives the vehicle speed vso based on the wheel speed VW of the rear wheel having the higher wheel speed VW among both the left and right rear wheels 13 and 14.

The slip value derivation unit M13 derives a slip value that is a value indicating the degree of deceleration slip of the plurality of wheels 11 to 14. In the present embodiment, the slip value derivation unit M13 derives the slip rate SLP of the wheel as a slip value. The slip value derivation unit M13 derives a value obtained by dividing a value obtained by subtracting the wheel speed VW of the wheel from the vehicle speed VS0 by the vehicle speed VS0 as the slip rate SLP. The slip rate SLP of the left front wheel 11 is referred to as "slip rate SLP1", the slip rate SLP of the right front wheel 12 is referred to as "slip rate SLP2", the slip rate SLP of the left rear wheel 13 is referred to as "slip rate SLP3", and the slip rate SLP of the right rear wheel 14 is referred to as "slip rate SLP4".

The wheel-acceleration derivation unit M15 derives the wheel acceleration DVW of the plurality of wheels 11 to 14. Specifically, the wheel-acceleration derivation unit M15 derives a value obtained by time-differentiating the wheel speed VW as the wheel acceleration DVW. Therefore, the wheel-acceleration derivation unit M15 derives a positive value as the wheel acceleration DVW when the wheel speed VW increases, and derives a negative value as the wheel acceleration DVW when the wheel speed VW reduces. The wheel acceleration DVW of the left front wheel 11 is referred to as "wheel acceleration DVW1", the wheel acceleration DVW of the right front wheel 12 is referred to as "wheel acceleration DVW2", the wheel acceleration DVW of the left rear wheel 13 is referred to as "wheel acceleration DVW3", and the wheel acceleration DVW of the right rear wheel 14 is referred to as "wheel acceleration DVW4".

When the ABS control is performed on both the left and right rear wheels 13 and 14, the two-wheel lock determination unit M17 determines whether or not the two-wheel locked state in which both the left and right rear wheels 13 and 14 are locked is established. A specific content of the processing of determining whether or not the two-wheel locked state is established will be described later.

The control unit M19 implements ABS control. Specifically, when the slip rate SLP1 of the left front wheel 11 exceeds a start determination threshold SLPth1, the control unit M19 can determine that the left front wheel 11 has a possibility of being locked, and thus implements the ABS control for adjusting the braking force Fx1 of the left front wheel 11. When the slip rate SLP2 of the right front wheel 12 exceeds the start determination threshold SLPth1, the control unit M19 can determine that the right front wheel 12 has a possibility of being locked, and thus implements the ABS control for adjusting the braking force Fx2 of the right front wheel 12. When the slip rate SLP of at least one rear wheel of the left and right rear wheels 13 and 14 exceeds the start determination threshold SLPth1, the control unit M19 can determine that the rear wheel has a possibility of being locked, and thus implements the ABS control for adjusting the braking forces Fx3 and Fx4 of both rear wheels 13 and 14. Note that the braking forces Fx1 to Fx4 of the wheels controlled by the control unit M19 are indication values of the braking force applied to the wheels.

The ABS control on both the left and right rear wheels 13 and 14 includes a cross processing and a split road surface processing. The cross processing can be said to be an ABS control in a case where the road surface on which the vehicle 10 travels is not a split road surface. The split road surface processing can be said to be an ABS control in a case where the road surface on which the vehicle 10 travels is a split road surface. The split road surface is a road surface in which a u value is greatly different between a road surface to which the left wheel is brought into contact and a road surface to which the right wheel is brought into contact.

The cross processing will be described with reference to FIG. 3. In (A) of FIG. 3, a broken line indicates the transition of the braking force Fx3 of the left rear wheel 13, and an alternate long and short dash line indicates the transition of the braking force Fx4 of the right rear wheel 14. In (B) of FIG. 3, a broken line indicates transition of the slip rate SLP3 of the left rear wheel 13, and an alternate long and short dash line indicates transition of the slip rate SLP4 of the right rear wheel 14. In (C) of FIG. 3, a broken line indicates the transition of the wheel speed VW3 of the left rear wheel 13, an alternate long and short dash line indicates the transition of the wheel speed VW4 of the right rear wheel 14, and a solid line indicates the transition of the vehicle speed VS0.

Figure 3:
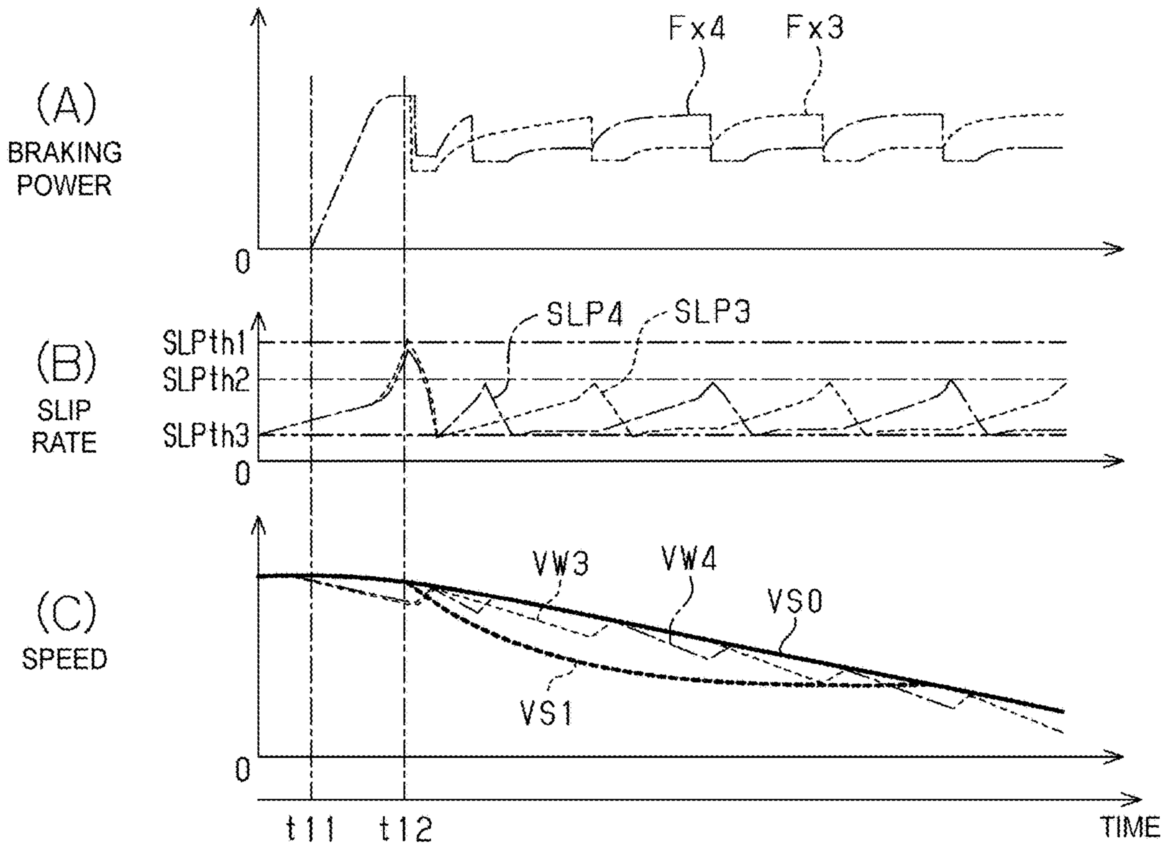
FIG. 3 is a timing chart when a cross processing is executed as an anti-lock brake control for both the left and right wheels.

In the example illustrated in FIG. 3, braking forces Fx3 and Fx4 start to be applied to both rear wheels 13 and 14 from timing t11. Then, all of the wheel speed VW3 of the left rear wheel 13, the wheel speed VW4 of the right rear wheel 14, and the vehicle speed VS0 start to reduce. As the braking forces Fx3 and Fx4 of the rear wheels 13 and 14 increase, the slip rate SLP3 of the left rear wheel 13 and the slip rate SLP4 of the right rear wheel 14 increase, respectively. Then, at timing t12, the slip rates SLP3 and SLP4 of both rear wheels 13 and 14 exceed the start determination threshold SLPth1, and thus the control unit M19 starts to implement the ABS control. Specifically, the control unit M19 starts the cross processing of the ABS control.

The cross processing is an ABS control in which one rear wheel of the left and right rear wheels 13 and 14 is a first wheel that increases the braking force, and the other rear wheel is a second wheel that adjusts the braking force in a range of less than the braking force of the first wheel. In the cross processing, the control unit M19 alternately switches between a right-wheel period in which the right rear wheel 14 is set as the first wheel and the left rear wheel 13 is set as the second wheel and a left-wheel period in which the left rear wheel 13 is set as the first wheel and the right rear wheel 14 is set as the second wheel. For example, when the right-wheel period is set as the first period, the left-wheel period corresponds to the second period. On the other hand, when the left-wheel period is set as the first period, the right-wheel period corresponds to the second period. The slip rate SLP of the first wheel is set to "slip rate SLPa", and the slip rate SLP of the second wheel is set to "slip rate SLPb". For example, when the left rear wheel 13 is the first wheel, the slip rate SLP3 of the left rear wheel 13 corresponds to the slip rate SLPa, and the slip rate SLP4 of the right rear wheel 14 corresponds to the slip rate SLPb.

In the cross processing, when the slip rate SLPa of the first wheel exceeds the deceleration slip determination value SLPth2 under a situation where the slip rate SLPb of the second wheel is less than or equal to the deceleration slip determination value SLPth2, the control unit M19 switches the first wheel and the second wheel. A value smaller than the start determination threshold SLPth1 is set as the deceleration slip determination value SLPth2. For example, during the right-wheel period, when the slip rate SLP4 of the right rear wheel 14 that is the first wheel exceeds the deceleration slip determination value SLPth2 under a situation where the slip rate SLP3 of the left rear wheel 13 that is the second wheel is less than or equal to the deceleration slip determination value SLPth2, the control unit M19 ends the right-wheel period and starts the left-wheel period. For example, during the left-wheel period, when the slip rate SLP3 of the left rear wheel 13 that is the first wheel exceeds the deceleration slip determination value SLPth2 under a situation where the slip rate SLP4 of the right rear wheel 14 that is the second wheel is less than or equal to the deceleration slip determination value SLPth2, the control unit M19 ends the left-wheel period and starts the right-wheel period.

The control unit M19 sequentially executes a non-increase mode and an increase mode as modes for adjusting the braking force of the second wheel in the cross processing. The non-increase mode is a mode of not increasing the braking force of the second wheel. Specifically, the non-increase mode is a mode of reducing the slip rate SLPb of the second wheel by reducing and holding the braking force of the second wheel. The increase mode is a mode of increasing the braking force of the second wheel. Specifically, the increase mode increases the braking force of the second wheel within a range in which a ratio of the braking force of the second wheel with respect to the braking force of the first wheel is less than or equal to a specified ratio. The specified ratio is a value less than 100%. For example, a value of greater than or equal to 70% and less than or equal to 90% is set as the specified ratio.

Note that the control unit M19 shifts the mode from the non-increase mode to the increase mode on condition that the slip rate SLPb of the second wheel becomes less than a slip resolution determination value SLPth3 during the adjustment of the braking force of the second wheel in the non-increase mode. The slip resolution determination value SLPth3 is a criterion for determining whether the deceleration slip of the wheel has been resolved. A value smaller than the deceleration slip determination value SLPth2 is set as the slip resolution determination value SLPth3.

When the control unit M19 executes the cross processing, the slip rate SLPb of the second wheel may exceed the deceleration slip determination value SLPth2 under a situation where the slip rate SLPa of the first wheel is less than or equal to the deceleration slip determination value SLPth2. In this case, since it can be determined that the road surface on which the vehicle 10 travels has become a split road surface, the control unit M19 ends the cross processing and executes the split road surface processing.

The split road surface processing will be described with reference to FIG. 4. In (A) of FIG. 4, a broken line indicates the transition of the braking force Fx3 of the left rear wheel 13, and an alternate long and short dash line indicates the transition of the braking force Fx4 of the right rear wheel 14. In (B) of FIG. 4, a broken line indicates transition of the slip rate SLP3 of the left rear wheel 13, and an alternate long and short dash line indicates transition of the slip rate SLP4 of the right rear wheel 14.

Figure 4:
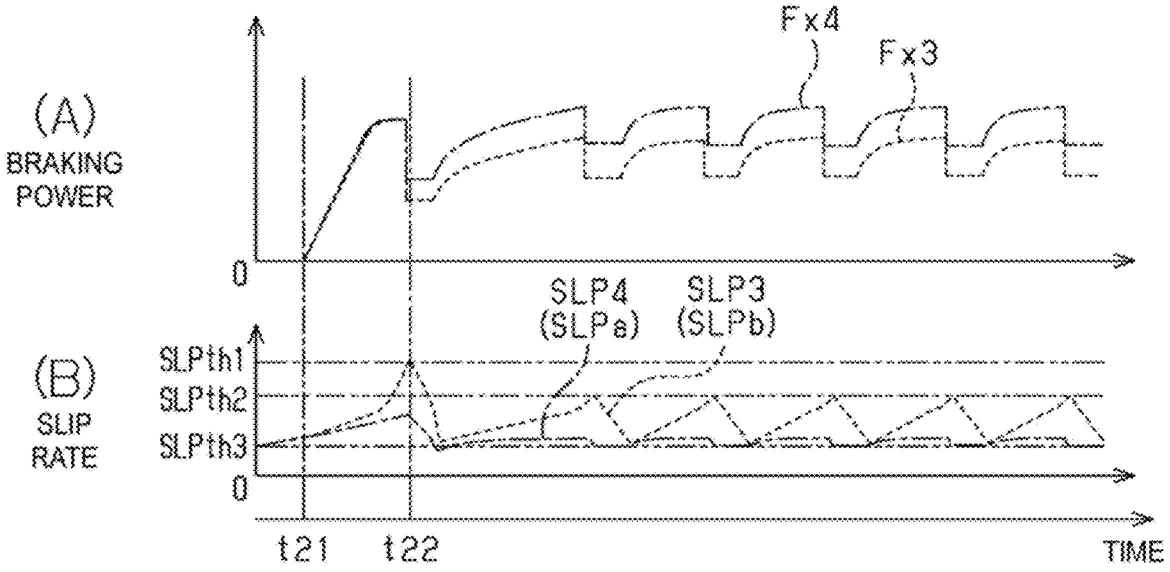
FIG. 4 is a timing chart when a split road surface processing is executed as the anti-lock brake control for both the left and right wheels.

In the example illustrated in FIG. 4, braking forces Fx3 and Fx4 start to be applied to both rear wheels 13 and 14 from timing t21. Then, as the braking forces Fx3 and Fx4 increase, the slip rates SLP3 and SLP4 increase in both the left rear wheel 13 and the right rear wheel 14. Then, at timing t22, the slip rate SLP3 of the left rear wheel 13 of both rear wheels 13 and 14 exceeds the start determination threshold SLPth1, and thus the control unit M19 starts to implement the ABS control. The processing of the control unit M19 after timing t22 is the split road surface processing.

The split road surface processing is an ABS control in which, of both the left and right rear wheels 13 and 14, the rear wheel having a smaller slip rate SLP is set as the first wheel and the rear wheel having a larger slip rate SLP is set as the second wheel. In the split road surface processing, the control unit M19 does not switch between the first wheel and the second wheel. In the example illustrated in FIG. 4, the control unit M19 adjusts the braking forces Fx3 and Fx4 of the left rear wheel 14 and the right rear wheel 13 so that both slip rates SLP3 and SLP4 of the left rear wheel 13 and the right rear wheel 14 become less than or equal to the deceleration slip determination value SLPth2 while maintaining a state in which the right rear wheel 14 is set as the first wheel and the left rear wheel 13 is set as the second wheel. Specifically, the control unit M19 adjusts the braking force of the first wheel and the second wheel while stopping the interchange of the first wheel and the second wheel and maintaining a state in which the braking force of the second wheel is larger than the braking force of the first wheel. For example, when the slip rate SLPb of the second wheel exceeds the deceleration slip determination value SLPth2, the control unit M19 reduces both braking forces of the first wheel and the second wheel. When the slip rate SLPb of the second wheel becomes less than the slip resolution determination value SLPth3 by reducing the braking force, the control unit M19 increases both braking forces of the first wheel and the second wheel.

When the control unit M19 executes the split road surface processing, the slip rate SLPa of the first wheel may exceed the deceleration slip determination value SLPth2 under a situation where the slip rate SLPb of the second wheel is less than or equal to the deceleration slip determination value SLPth2. In this case, since it can be determined that the road surface on which the vehicle 10 travels is no longer the split road surface, the control unit M19 ends the split road surface processing and executes the cross processing.

Figure 5:
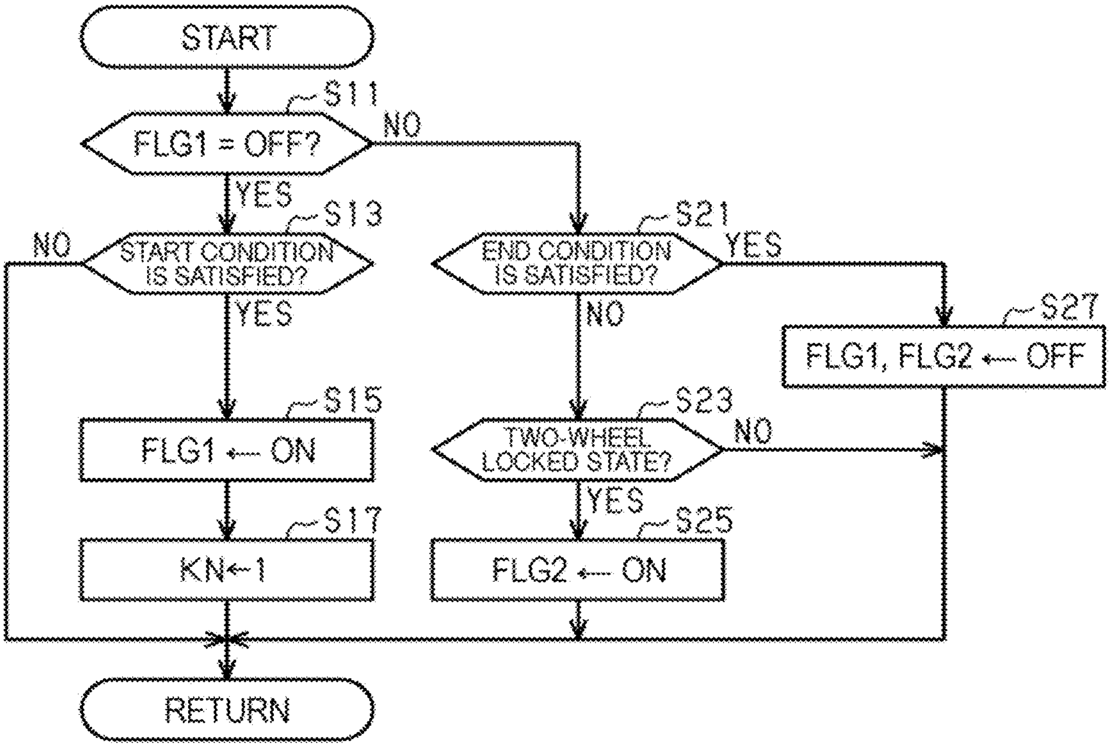
FIG. 5 is a flowchart illustrating a processing routine executed by an execution device of the control device.

Flow of Processing when ABS Control is Implemented on Both the Left and Right Rear Wheels With reference to FIG. 5, a processing routine for determining whether or not to start the ABS control on both the left and right rear wheels 13 and 14 and determining whether or not to end the ABS control will be described. The execution device 51 executes the control program to repeatedly execute the present processing routine for every predetermined control cycle.

In this processing routine, in step S11, the execution device 51 functions as the control unit M19 to determine whether or not the ABS implementation flag FLG1 is set to OFF. The ABS implementation flag FLG1 is set to ON when the ABS control is performed on both the left and right rear wheels 13 and 14, and the ABS implementation flag FLG1 is set to OFF when the ABS control is not performed. When the ABS implementation flag FLG1 is set to OFF (S11: YES), the execution device 51 proceeds the processing to step S13. On the other hand, when the ABS implementation flag FLG1 is set to ON (S11: NO), the execution device 51 proceeds the processing to step S21.

In step S13, the execution device 51 functions as the control unit M19 to determine whether or not the start condition of the ABS control on both the left and right rear wheels 13 and 14 is satisfied. When at least one of the following two conditions is satisfied, it is assumed that the start condition is satisfied. On the other hand, when neither of the two conditions is satisfied, it is assumed that the start condition is not satisfied.

The slip rate SLP3 of the left rear wheel 13 exceeds the start determination threshold SLPth1.

The slip rate SLP4 of the right rear wheel 14 exceeds the start determination threshold SLPth1.

When determining that the start condition is satisfied (S13: YES), the execution device 51 proceeds the processing to step S15. On the other hand, when determining that the start condition is not satisfied (S13: NO), the execution device 51 temporarily ends the present processing routine.

In step S15, the execution device 51 functions as the control unit M19 to set the ABS implementation flag FLG1 to ON. In step S17, the execution device 51 functions as the control unit M19 to set the condition coefficient KN to 1. The condition coefficient KN is a coefficient for determining whether to execute the cross processing or to execute the split road surface processing. In the present embodiment, when the start condition is satisfied and the ABS control is started, the condition coefficient KN is set to 1 to select the cross processing. Thereafter, the execution device 51 temporarily ends the present processing routine.

In step S21, the execution device 51 functions as the control unit M19 to determine whether or not the end condition for ending the ABS control on both the left and right rear wheels 13 and 14 is satisfied. For example, the execution device 51 determines that the end condition is satisfied when the vehicle 10 is stopped or when there is no braking request for the rear wheels 13 and 14. When determining that the end condition is satisfied (S21: YES), the execution device 51 proceeds the processing to step S27. On the other hand, when determining that the end condition is not satisfied (S21: NO), the execution device 51 proceeds the processing of step S23.

In step S23, the execution device 51 functions as the two-wheel lock determination unit M17 to determine whether or not the two-wheel locked state has been established. When determining that the two-wheel locked state has been established (S23: YES), the execution device 51 proceeds the processing to step S25. On the other hand, when determining that the two-wheel locked state has not been established (S23: NO), the execution device 51 temporarily ends the present processing routine.

In step S25, the execution device 51 functions as the control unit M19 to set the two-wheel lock flag FLG2 to ON. Thereafter, the execution device 51 temporarily ends the present processing routine.

In step S27, the execution device 51 functions as the control unit M19 to set both the ABS implementation flag FLG1 and the two-wheel lock flag FLG2 to OFF. Thereafter, the execution device 51 temporarily ends the present processing routine.

Figure 6:
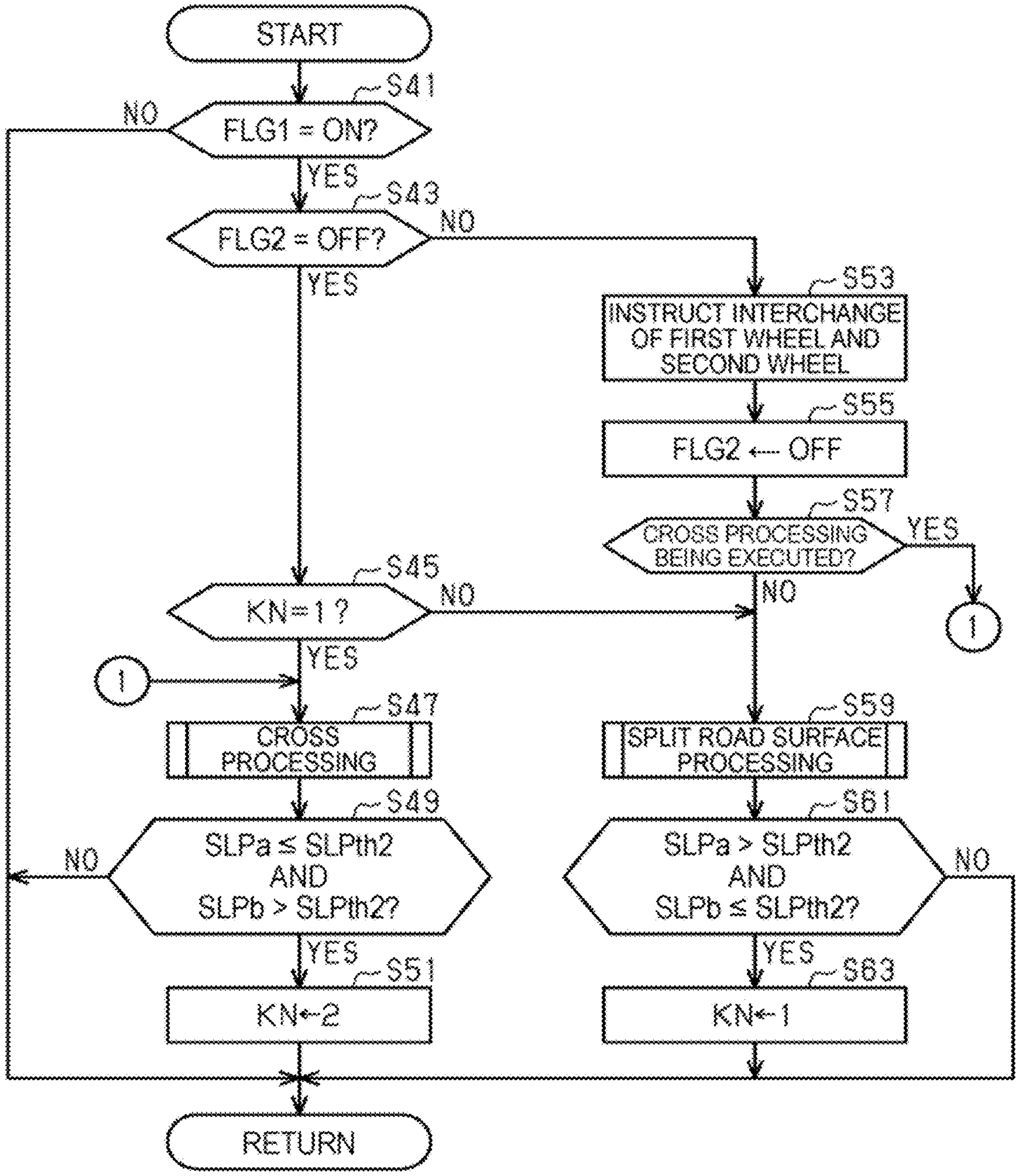
FIG. 6 is a flowchart illustrating a processing routine executed by the execution device.

A processing routine for implementing the ABS control on both the left and right rear wheels 13 and 14 will be described with reference to FIG. 6. The execution device 51 executes the control program to repeatedly execute the present processing routine for every predetermined control cycle. The plurality of steps S41 to S63 constituting the present processing routine are processing executed by the execution device 51 functioning as the control unit M19.

In this processing routine, in step S41, the execution device 51 determines whether or not the ABS implementation flag FLG1 is set to ON. When the ABS implementation flag FLG1 is set to ON (S41: YES), the execution device 51 proceeds the processing to step S43. On the other hand, when the ABS implementation flag FLG1 is set to OFF (S41: NO), the execution device 51 temporarily ends the present processing routine.

In step S43, the execution device 51 determines whether or not the two-wheel lock flag FLG2 is set to OFF. When the two-wheel lock flag FLG2 is set to OFF (S43: YES), the execution device 51 proceeds the processing to step S45. On the other hand, when the two-wheel lock flag FLG2 is set to ON (S43: NO), the execution device 51 proceeds the processing to step S53.

In step S45, the execution device 51 determines whether or not the condition coefficient KN is 1. When the condition coefficient KN is 1 (S45: YES), the execution device 51 proceeds the processing to step S47. On the other hand, when the condition coefficient KN is not 1 (S45: NO), the execution device 51 proceeds the processing to step S59.

In step S47, the execution device 51 executes the cross processing as the ABS control for both the left and right rear wheels 13 and 14. In step S49, the execution device 51 determines whether or not the following two conditions are satisfied. When both of the two conditions are satisfied, it can be regarded that the road surface on which the vehicle 10 travels has become a split road surface.

The slip rate SLPa of the first wheel is less than or equal to the deceleration slip determination value SLPth2.

The slip rate SLPb of the second wheel is larger than the deceleration slip determination value SLPth2.

When both of the two conditions are satisfied (S49: YES), the execution device 51 proceeds the processing to step S51. On the other hand, when at least one of the two conditions is not satisfied (S49: NO), the execution device 51 temporarily ends the present processing routine.

In step S51, the execution device 51 sets the condition coefficient KN to 2. Thereafter, the execution device 51 temporarily ends the present processing routine.

In step S53, the execution device 51 instructs interchange of the first wheel and the second wheel. That is, the execution device 51 interchanges the first wheel and the second wheel when determining that the two-wheel locked state is established. In step S55, the execution device 51 sets the two-wheel lock flag FLG2 to OFF.

In step S57, the execution device 51 determines whether or not the cross processing is being executed as the ABS control for both the left and right rear wheels 13 and 14. When the cross processing is being executed (S57: YES), the execution device 51 proceeds the processing to step S47. That is, when determining that the two-wheel locked state is established during the execution of the cross processing, the execution device 51 continues the cross processing after interchanging the first wheel and the second wheel. On the other hand, when the cross processing is not being executed (S57: NO), the split road surface processing is being executed and hence the execution device 51 proceeds the processing to step S59. That is, when determining that the two-wheel locked state is established during the execution of the split road surface processing, the execution device 51 continues the split road surface processing after interchanging the first wheel and the second wheel.

In step S59, the execution device 51 executes the split road surface processing as the ABS control for both the left and right rear wheels 13 and 14. In step S61, the execution device 51 determines whether or not the following two conditions are satisfied. When both of the two conditions are satisfied, it can be regarded that the road surface on which the vehicle 10 travels is no longer the split road surface.

The slip rate SLPa of the first wheel is larger than the deceleration slip determination value SLPth2.

The slip rate SLPb of the second wheel is less than or equal to the deceleration slip determination value SLPth2.

When both of the two conditions are satisfied (S61: YES), the execution device 51 proceeds the processing to step S63. On the other hand, when at least one of the two conditions is not satisfied (S61: NO), the execution device 51 temporarily ends the present processing routine.

In step S63, the execution device 51 sets the condition coefficient KN to 1. Thereafter, the execution device 51 temporarily ends the present processing routine.

Determination on Whether or Not Two-Wheel Locked State is Established

Figure 7:
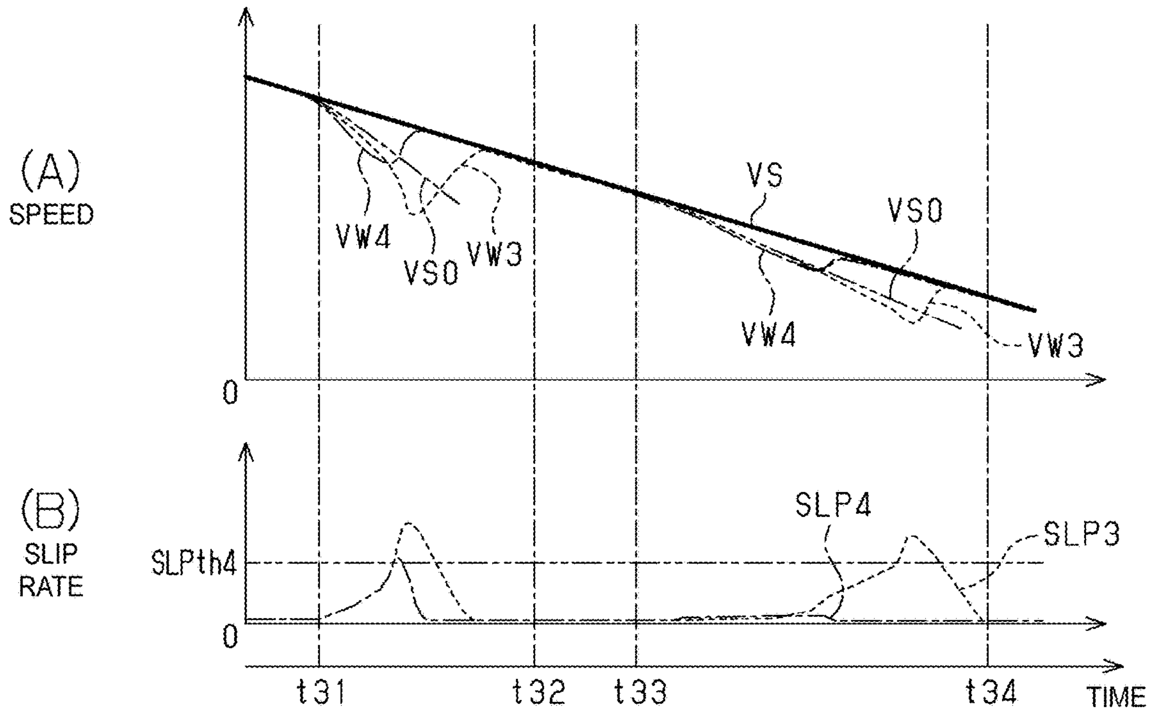
FIG. 7 is a timing chart for explaining a processing of determining whether or not a two-wheel locked state is established.

With reference to FIG. 7, a processing of determining whether or not the two-wheel locked state is established will be described. The execution device 51 functions as a two-wheel lock determination unit M17 to execute the process. Note that in (A) of FIG. 7, the broken line indicates the transition of the wheel speed VW3 of the left rear wheel 13, the alternate long and short dash line indicates the transition of the wheel speed VW4 of the right rear wheel 14, the solid line indicates the actual value VS of the vehicle speed, and the alternate long and two short dashes line indicates the transition of the vehicle speed VS0. In (B) of FIG. 7, a broken line indicates transition of the slip rate SLP3 of the left rear wheel 13, and an alternate long and short dash line indicates transition of the slip rate SLP4 of the right rear wheel 14.

When the ABS control is implemented on both rear wheels 13 and 14, that is, when the cross processing or the split road surface processing is performed, the execution device 51 executes a processing of determining whether or not the two-wheel locked state is established.

As in a period from timing t31 to timing t32 in FIG. 7, the execution device 51 determines that the two-wheel locked state is established on condition that both of the slip rates SLP3 and SLP4 of both rear wheels 13 and 14 are greater than or equal to the two-wheel deceleration slip determination value SLPth4. A value less than or equal to the deceleration slip determination value SLPth2 and larger than the slip resolution determination value SLPth3 is set as the two-wheel deceleration slip determination value SLPth4. Specifically, the execution device 51 determines that the two-wheel locked state is established when the duration of the state in which both the slip rate SLP3 and the slip rate SLP4 are greater than or equal to the two-wheel deceleration slip determination value SLPth4 becomes longer than or equal to a specified time. As the specified time, a length of time in which determination can be made whether or not both the actual value of the slip rate of the left rear wheel 13 and the actual value of the slip rate of the right rear wheel 14 are greater than or equal to the two-wheel deceleration slip determination value SLPth4 is set.

As in the period from timing t33 to timing t34, the degree of deceleration slip of both rear wheels 13 and 14 may gradually increase. In this case, as the wheel speeds VW3 and VW4 of both rear wheels 13 and 14 reduce, the vehicle speed VS0 also reduces as indicated by an alternate long and two short dashes line in FIG. 7. Therefore, even if deceleration slip occurs in both rear wheels 13 and 14, the slip rates SLP3 and SLP4 do not increase. That is, neither of the slip rates SLP3 and SLP4 becomes greater than or equal to the two-wheel deceleration slip determination value SLPth4.

Therefore, the execution device 51 determines that the two-wheel locked state is established on condition that both of the following conditions (A1) and (A2) are satisfied. Specifically, in a case where the duration of the state in which both of the two conditions (A1) and (A2) are satisfied is longer than or equal to the specified time, the execution device 51 determines that the two-wheel locked state is established.

(A1) A difference between the slip rate SLP3 of the left rear wheel 13 and the slip rate SLP4 of the right rear wheel 14 is less than a predetermined difference.

(A2) Both the wheel acceleration DVW3 of the left rear wheel 13 and the wheel acceleration DVW4 of the right rear wheel 14 are less than or equal to the wheel-acceleration determination value DVWth.

When the difference between the slip rate SLP3 and the slip rate SLP4 is less than the predetermined difference, it can be considered that there is almost no difference between the slip rate SLP3 and the slip rate SLP4. The wheel-acceleration determination value DVWth is a criterion for determining whether or not the wheel speeds VW3 and VW4 of the rear wheels 13 and 14 are reducing.

Operations and Effects of Present Embodiment (1) When the slip rate SLP exceeds the start determination threshold SLPth1 in at least one of both rear wheels 13 and 14 under a situation where the braking force is applied to the vehicle 10, the cross processing is started as the ABS control for the rear wheels 13 and 14. As illustrated in FIG. 3, in the cross processing, the left-wheel period in which the left rear wheel 13 is set to the first wheel and the right rear wheel 14 is set to the second wheel and the right-wheel period in which the right rear wheel 14 is set to the first wheel and the left rear wheel 13 is set to the second wheel are alternately switched.

The cross processing has a non-increase mode and an increase mode as modes for controlling the braking force of the second wheel. When the braking force of the second wheel is adjusted in the increase mode, the braking force of the second wheel is increased in a range of less than the braking force of the first wheel. That is, when the cross processing is executed, there is a period in which both the braking force of the first wheel and the braking force of the second wheel are increased. However, in this period, a state in which the braking force of the second wheel is less than the braking force of the first wheel is maintained. Therefore, the deceleration slip is less likely to increase in the second wheel as compared with the first wheel. Therefore, it is possible to prevent both the left and right rear wheels 13 and 14 from falling into a state of being locked during the implementation of the ABS control. That is, it is possible to suppress decrease in braking efficiency during the implementation of the ABS control.

(2) As a method of suppressing both the left and right rear wheels 13 and 14 from entering a state of being locked during the implementation of the ABS control, a method of not increasing the braking force of the second wheel is also considered. In this case, although it is possible to suppress both rear wheels 13 and 14 from entering a state of being locked, the difference in braking force between both the left and right rear wheels 13 and 14 increases, and the yaw moment of the vehicle 10 increases. In addition, since the braking force of the entire vehicle 10 is less likely to increase, the deceleration of the vehicle 10 is less likely to increase. In this regard, in the present embodiment, since the braking force of the second wheel is also increased, the braking force difference between both the left and right rear wheels 13 and 14 can be suppressed from increasing, and a reduction in the braking force of the entire vehicle 10 due to the implementation of the ABS control can also be suppressed. Therefore, during the implementation of the ABS control, the yaw moment of the vehicle 10 can be suppressed from increasing while suppressing a reduction in the deceleration of the vehicle 10.

(3) A thick broken line in (C) of FIG. 3 indicates a transition of the vehicle speed VS1 derived in a case where the right and left wheel independent type ABS control is implemented. When both rear wheels 13 and 14 are locked, the wheel speeds VW3 and VW4 of both rear wheels 13 and 14 greatly reduce, so that the vehicle speed VS1 may become significantly small as compared with the actual value of the vehicle speed. In this case, the accuracy of deriving the slip rates SLP1 to SLP4 of the wheels 11 to 14 decreases.

In this respect, it is possible to suppress both rear wheels 13 and 14 from falling into a locked state by implementing the above-described control as the ABS control on both the left and right rear wheels 13 and 14. Therefore, the estimation accuracy of the vehicle speed VS0 at the time of braking of the vehicle 10 can be suppressed from decreasing. Therefore, the accuracy of deriving the slip rates SLP1 to SLP4 of the wheels 11 to 14 can also be suppressed from decreasing.

(4) When the braking force of the second wheel is increased in the increase mode, the braking force of the second wheel is increased in a range in which a ratio of the braking force of the second wheel with respect to the braking force of the first wheel is less than or equal to a specified ratio. Therefore, when the mode is switched from the non-increase mode to the increase mode, the braking force of the second wheel can be suppressed from rapidly increasing. Therefore, a decrease in stability of the behavior of the vehicle 10 due to an increase in the braking force of the second wheel can be suppressed.

(5) In the present embodiment, when the non-increase mode is executed as the mode for adjusting the braking force of the second wheel, as illustrated in FIG. 3, when the braking force of the second wheel is reduced to a certain degree of braking force, the braking force of the second wheel is maintained. When the slip rate SLPb of the second wheel becomes less than the slip resolution determination value SLPth3, it can be determined that the deceleration slip of the second wheel has been resolved, and thus the mode shifts from the non-increase mode to the increase mode. That is, after deceleration slip of the second wheel is resolved, the braking force of the second wheel is started to be increased. Therefore, the effect of suppressing both rear wheels 13 and 14 from entering a state of being locked during the implementation of the ABS control can be further enhanced.

Note that even when the braking force of the second wheel is maintained at a certain degree of magnitude by the non-increase mode, the deceleration slip of the second wheel may not be easily resolved. In this case, the deceleration slip of the second wheel is resolved by further reducing the braking force of the second wheel.

(6) When the cross processing is executed, the slip rate SLPb of the second wheel may exceed the deceleration slip determination value SLPth2 under a situation where the slip rate SLPa of the first wheel is less than or equal to the deceleration slip determination value SLPth2. In this case, there is a possibility that the vehicle 10 is traveling on a split road surface where the u value of the road surface to which the second wheel is brought into contact is lower than the u value of the road surface to which the first wheel is brought into contact. Therefore, the cross processing is ended and the split road surface processing is started.

As illustrated in FIG. 4, in the split road surface processing, switching between the first wheel and the second wheel is stopped. Then, the braking forces of the first wheel and the second wheel are adjusted while maintaining a state in which the braking force of the first wheel is larger than the braking force of the second wheel. Specifically, when the braking force of the first wheel and the braking force of the second wheel are increased, the slip rate SLPb of the second wheel brought into contact with the road of low u increases. Then when the slip rate SLPb of the second wheel exceeds the deceleration slip determination value SLPth2, both the braking force of the first wheel and the braking force of the second wheel are reduced. When the slip rate SLPb of the second wheel becomes less than the slip resolution determination value SLPth3, it can be determined that the deceleration slip of the second wheel has been resolved, and thus both the braking force of the first wheel and the braking force of the second wheel are increased.

As described above, in the split road surface processing, the slip rate SLPa of the first wheel can be suppressed from increasing while having the braking force of the first wheel brought into contact with the road of high u larger than the braking force of the second wheel brought into contact with the road of low u. Therefore, it is possible to prevent both the left and right rear wheels 13 and 14 from falling into a locked state. Furthermore, an estimation accuracy of the vehicle speed VS0 can be suppressed from decreasing by deriving the vehicle speed vso based on the wheel speed VW of the first wheel.

(7) Even if the cross processing or the split road surface processing is executed, there may be a case where the two-wheel locked state is established in which both the left and right rear wheels 13, 14 are locked. For example, when any one of the following conditions (B1), (B2), (B3), and (B4) is satisfied, there is a possibility that the two-wheel locked state is established during the execution of the cross processing or the split road surface processing.

(B1) There is a large deviation between the braking characteristic of the rear wheel braking device 30 for the left rear wheel 13 and the braking characteristic of the rear wheel braking device 30 for the right rear wheel 14.

(B2) There is a large deviation between the u value of the road surface to which the left rear wheel 13 is brought into contact and the u value of the road surface to which the right rear wheel 14 is brought into contact.

(B3) There is a large deviation between the u value of the tire of the left rear wheel 13 and the u value of the tire of the right rear wheel 14.

(B4) There is a large deviation between the diameter of the tire of the left rear wheel 13 and the diameter of the tire of the right rear wheel 14.

Here, the braking characteristic of the braking device is a braking ratio which is a ratio between the indication value of the braking force and the actual value of the braking force. When the braking ratio is small, the actual value of the braking force is small with respect to the indication value of the braking force.

Figure 8:
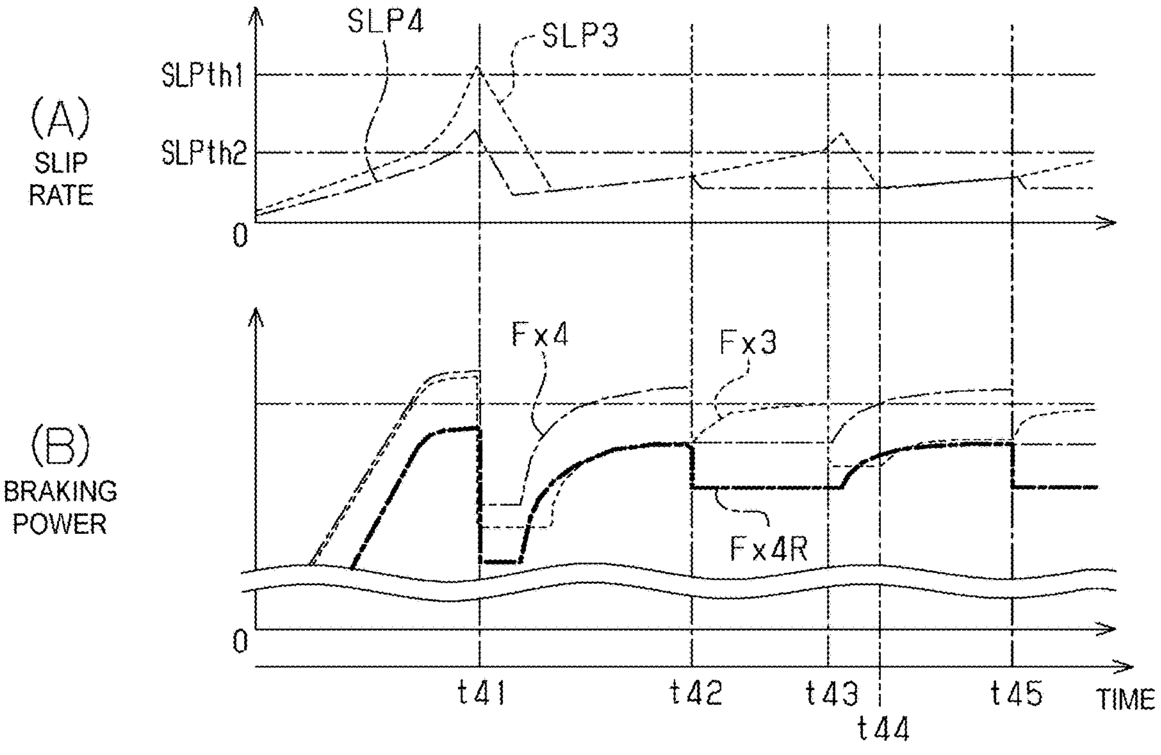
FIG. 8 is a timing chart when determined that the two-wheel locked state is established during execution of the anti-lock brake control for both the left and right wheels.

Referring to FIG. 8, the ABS control when there is a large deviation between the braking characteristic of the rear wheel braking device 30 for the left rear wheel 13 and the braking characteristic of the rear wheel braking device 30 for the right rear wheel 14 will be described. The example illustrated in FIG. 8 is for a case where the braking ratio of the rear wheel braking device 30 for the left rear wheel 13 is smaller than the braking ratio of the rear wheel braking device 30 for the right rear wheel 14. In (A) of FIG. 8, a broken line indicates the transition of the slip rate SLP3 of the left rear wheel 13, and an alternate long and short dash line indicates the transition of the slip rate SLP4 of the right rear wheel 14. In (B) of FIG. 8, a thin broken line indicates the transition of the indication value Fx3 of the braking force of the left rear wheel 13, a thin alternate long and short dash line indicates the transition of the indication value Fx4 of the braking force of the right rear wheel 14, and a thick alternate long and short dash line indicates the transition of the actual value Fx4R of the braking force of the right rear wheel 14. Note that in the present example, a large deviation occurs between the indication value Fx4 of the braking force and the actual value Fx4R of the braking force in the right rear wheel 14, but a deviation hardly occurs between the indication value Fx3 of the braking force and the actual value of the braking force in the left rear wheel 13.

The ABS control on both the left and right rear wheels 13 and 14 is started at timing t41 under a situation where the braking force is applied to the vehicle 10. At timing t42 during execution of the split road surface processing in which the right rear wheel 14 is set to the first wheel and the left rear wheel 13 is set to the second wheel, the execution device 51 determines that the two-wheel locked state is established. Therefore, the execution device 51 continues the split road surface processing after interchanging the first wheel and the second wheel. That is, after timing t42, the left rear wheel 13 becomes the first wheel, and the right rear wheel 14 becomes the second wheel. Therefore, the indication value Fx3 of the braking force of the left rear wheel 13 is increased while the indication value Fx4 of the braking force of the right rear wheel 14 is decreased such that the indication value Fx3 of the braking force of the left rear wheel 13 becomes larger than the indication value Fx4 of the braking force of the right rear wheel 14. The indication value Fx4 of the braking force of the right rear wheel 14 is not increased until the braking force difference between the right rear wheel 14 and the left rear wheel 13 reaches a certain degree of magnitude.

In the example illustrated in FIG. 8, at timing t43, in a state where the slip rate SLP4 of the right rear wheel 14, which is the second wheel, is less than or equal to the deceleration slip determination value SLPth2, the slip rate SLP3 of the left rear wheel 13, which is the first wheel, exceeds the deceleration slip determination value SLPth2. Therefore, the split road surface processing is ended and the cross processing is executed. Then, the first wheel and the second wheel are switched. While the indication value Fx4 of the braking force of the right rear wheel 14, which is the first wheel, is increased, the indication value Fx3 of the braking force of the left rear wheel 13, which is the second wheel, is decreased. In the cross processing, the indication value Fx3 of the braking force of the left rear wheel 13 is increased from timing t44 at which the deceleration slip of the left rear wheel 13 is resolved.

After timing t44, the actual value of the braking force of the left rear wheel 13 and the actual value Fx4R of the braking force of the right rear wheel 14 become substantially the same. Therefore, both the slip rate SLP3 of the left rear wheel 13 and the slip rate SLP4 of the right rear wheel 14 gradually increase. That is, both of the above conditions (A1) and (A2) are satisfied. Then, at timing t45 during the execution of the cross processing, the execution device 51 determines that the two-wheel locked state is established, and continues the execution of the cross processing after interchanging the first wheel and the second wheel.

When determined that the two-wheel locked state is established during the implementation of the ABS control, the first wheel and the second wheel are switched. As a result, the braking force of the rear wheel of which the slip rate SLP is less likely to increase, of the first wheel and the second wheel, is suppressed from increasing. As a result, the slip rate SLP of the rear wheel of which the slip rate SLP is less likely to increase can be suppressed from increasing. Therefore, even if the two-wheel locked state is established due to the execution of the cross processing or the split road surface processing, the two-wheel locked state can be resolved early.

(8) For example, when both of the slip rates SLP3 and SLP4 of both of the rear wheels 13 and 14 become larger than or equal to the two-wheel deceleration slip determination value SLPth4, determination is made that the two-wheel locked state is established. Even when the slip rates SLP3 and SLP4 of both of the rear wheels 13 and 14 are not increased, determination is made that the two-wheel locked state is established when both of the above conditions (A1) and (A2) are satisfied. Therefore, the determination accuracy as to whether or not the two-wheel locked state is established can be increased.

Modified Example

The present embodiment can be modified and implemented as follows. The present embodiment and the following modified examples can be implemented in combination with each other within a technically consistent scope.

When determined that the two-wheel locked state is established, the ABS control for adjusting the braking force of one rear wheel of both the left and right rear wheels 13 and 14 may be implemented while maintaining the braking force of the other rear wheel. Furthermore, when determined that the two-wheel locked state is established, the ABS control for adjusting the braking force of both of the rear wheels 13, 14 may be implemented so that the braking force difference between both the left and right rear wheels 13, 14 becomes larger.

When the cross processing or the split road surface processing is being executed, it is not essential to execute the processing of determining whether or not the two-wheel locked state is established.

The execution device 51 may end the cross processing and start the split road surface processing when the slip rate SLPb of the second wheel becomes larger than the slip rate SLPa of the first wheel during the execution of the cross processing.

The execution device 51 may end the split road surface processing and start the cross processing when the slip rate SLPa of the first wheel becomes larger than the slip rate SLPb of the second wheel during the execution of the split road surface processing.

When the cross processing is executed as the ABS control for the rear wheels 13 and 14, it is not essential to execute the split road surface processing.

In the above embodiment, when the cross processing is being executed, the first wheel and the second wheel are switched when the slip rate SLPa of the first wheel exceeds the deceleration slip determination value SLPth2, but this is not the sole case. For example, in a case where the left rear wheel 13 is the first wheel, when the duration of the state in which the braking force Fx3 of the left rear wheel 13 is increased reaches a predetermined duration, the left rear wheel 13 may be set as the second wheel and the right rear wheel 14 may be set as the first wheel, so that the braking force Fx4 of the right rear wheel 14 is increased while the braking force of the left rear wheel 13 is decreased.

In the above embodiment, when adjusting the braking force of the second wheel, the mode is shifted from the non-increase mode to the increase mode when the slip rate SLPb of the second wheel becomes less than the slip resolution determination value SLPth3, but this is not the sole case. For example, when a predetermined time has elapsed from the starting time point of the non-increase mode, the mode may be shifted from the non-increase mode to the increase mode. In this case, a time during which the deceleration slip of the second wheel can be resolved may be set as the predetermined time.

In the cross processing, when at least one of the following two conditions (C1) and (C2) is satisfied, the mode for adjusting the braking force of the second wheel may be shifted from the non-increase mode to the increase mode.

(C1) The slip rate SLPb of the second wheel is less than the slip resolution determination value SLPth3.

(C2) A predetermined time has elapsed from the starting time point of the non-increase mode.

When the braking force of the second wheel is adjusted in the non-increase mode, a period for maintaining the braking force may not be provided as long as a period for reducing the braking force can be provided.

In the cross processing, if the braking force of the second wheel does not become greater than or equal to the braking force of the first wheel, the ratio of the braking force of the second wheel with respect to the braking force of the first wheel may be greater than the specified ratio by increasing the second braking force.

In a case where the start condition of the ABS control on both the left and right rear wheels 13 and 14 is satisfied, when the difference in the slip rates between both rear wheels 13 and 14 is greater than or equal to the determination slip rate difference, the split road surface processing may be executed from the beginning.

The control unit may switch between the first wheel and the second wheel when both of the following two conditions (D1) and (D2) are satisfied in the cross processing.

(D1) The slip rate SLPb of the second wheel (the slip value of the second wheel) is less than or equal to the deceleration slip determination value SLPth2.

(D2) Under a situation where the wheel acceleration DVW of the second wheel is greater than or equal to the wheel-acceleration determination value DVWth, the slip rate SLPa of the first wheel (the slip value of the first wheel) exceeds the deceleration slip determination value SLPth2, and the wheel acceleration DVW of the first wheel is less than or equal to the wheel-acceleration determination value DVWth.

When both of the following two conditions (E1) and (E2) are satisfied during the implementation of the ABS control, the control unit may end the cross processing, and execute the split road surface processing of adjusting the braking forces of the first wheel and the second wheel while stopping the interchange between the first wheel and the second wheel and maintaining a state in which the braking force of the first wheel is larger than the braking force of the second wheel.

(E1) The slip rate SLPa of the first wheel (the slip value of the first wheel) is less than or equal to the deceleration slip determination value SLPth2, and the wheel acceleration DVW of the first wheel is greater than or equal to the wheel-acceleration determination value DVWth.

(E2) Under a situation where the condition (E1) is satisfied, the slip rate SLPb of the second wheel (the slip value of the second wheel) exceeds the deceleration slip determination value SLPth2, and the wheel acceleration DVW of the second wheel is less than or equal to the wheel-acceleration determination value DVW.

In the above embodiment, the slip rate SLP is derived as the slip value indicating the degree of deceleration slip of the wheel, but this is not the sole case. For example, a slip amount that is a value obtained by subtracting the wheel speed VW from the vehicle speed VS0 may be derived as the slip value.

In the above embodiment, the case where the cross processing and the split road surface processing are executed on both the left and right rear wheels 13 and 14 has been described. However, the cross processing and the split road surface processing may be executed on both the left and right front wheels 11 and 12.

The control device 50 can be configured as a circuit including one or more processors operating according to a computer program, one or more dedicated hardware circuits such as dedicated hardware for executing at least some of various processing, or a combination thereof. Examples of the dedicated hardware include, for example, an ASIC which is an application specific integrated circuit. The processor includes a CPU and a memory such as a RAM and a ROM, and the memory stores a program code or a command configured to cause the CPU to execute processing. The memory, that is, the storage medium includes any available medium accessible by a general purpose or dedicated computer.

The brake system may have a configuration different from that of the brake system illustrated in FIG. 1 as long as the braking force of the plurality of wheels 11 to 14 can be individually adjusted.

Note that the expression "at least one" as used in the present specification means "one or more" of the desired options. As an example, the expression "at least one" as used in the present specification means "only one option" or "both of two options" if the number of options is two. As another example, the expression "at least one" as used in the present specification means "only one option" or "a combination of two or more arbitrary options" if the number of options is three or more.

Other Technical Ideas

Next, a technical idea that can be grasped from the above embodiment and modified example will be described as a supplementary not.

(Supplementary note 1) Preferably, when the slip value of at least one wheel of the right and left wheels exceeds a start determination threshold, the control unit starts the anti-lock brake control, and a value smaller than the start determination threshold is set as the deceleration slip determination value.

(Supplementary note 2) Preferably, a two-wheel lock determination unit that determines whether or not a two-wheel locked state in which both the left and right wheels are locked is established when the anti-lock brake control is performed is provided, and the control unit switches between the first wheel and the second wheel at a time point determination is made that the two-wheel locked state is established in the anti-lock brake control.

(Supplementary note 3) Preferably, a slip value derivation unit that derives a slip value that is a value indicating a degree of deceleration slip of the wheel is provided, and the two-wheel lock determination unit determines that the two-wheel locked state is established on condition that both the slip value of the first wheel and the slip value of the second wheel are greater than or equal to a two-wheel deceleration slip determination value.

(Supplementary note 4) Preferably, a slip value derivation unit that derives a slip value that is a value indicating a degree of deceleration slip of the wheel, and a wheel-acceleration derivation unit that derives a wheel acceleration which is an increasing speed of the rotation speed of the wheel are provided, and the two-wheel lock determination unit determines that the two-wheel locked state is established on condition that a difference between the slip value of the first wheel and the slip value of the second wheel is less than a predetermined difference and that both of the wheel acceleration of the first wheel and the wheel acceleration of the second wheel are less than or equal to a wheel-acceleration determination value.

The invention claimed is:

1. A vehicle braking control device comprising:

a control unit that implements an anti-lock brake control for suppressing both left and right wheels of a vehicle from being locked by adjusting braking forces of the left and right wheels; wherein in the anti-lock brake control, the control unit executes a cross processing of alternately switching between a first period in which one of the left and right wheels is a first wheel for increasing a braking force and the other of the left and right wheels is a second wheel for adjusting the braking force in a range of less than the braking force of the first wheel and a second period in which the other wheel is the first wheel and the one wheel is the second wheel, and increasing the braking force of the second wheel in both the first period and the second period.

2. The vehicle braking control device according to claim 1, wherein the control unit increases the braking force of the second wheel in a range in which a ratio of the braking force of the second wheel with respect to the braking force of the first wheel is less than or equal to a specified ratio in the cross processing.

3. The vehicle braking control device according to claim 1, further comprising:

a slip value derivation unit that derives a slip value that is a value indicating a degree of deceleration slip of the wheel, wherein in the cross processing, the control unit sequentially executes, as a mode of adjusting the braking force of the second wheel, a non-increase mode in which at least a decrease of the braking force of the second wheel is performed, of decrease and maintaining of the braking force of the second wheel, and an increase mode in which the braking force of the second wheel is increased, and shifts the mode from the non-increase mode to the increase mode on condition that the slip value of the second wheel becomes less than a slip resolution determination value during adjustment of the braking force of the second wheel in the non-increase mode.

4. The vehicle braking control device according to claim 1, further comprising:

a slip value derivation unit that derives a slip value that is a value indicating a degree of deceleration slip of the wheel, wherein in the cross processing, when the slip value of the first wheel exceeds a deceleration slip determination value under a situation where the slip value of the second wheel is less than or equal to the deceleration slip determination value, the control unit switches between the first wheel and the second wheel.

5. The vehicle braking control device according to claim 1, further comprising:

a slip value derivation unit that derives a slip value that is a value indicating a degree of deceleration slip of the wheel, wherein during implementation of the anti-lock brake control, when the slip value of the second wheel exceeds a deceleration slip determination value under a situation where the slip value of the first wheel is less than or equal to the deceleration slip determination value, the control unit ends the cross processing, and executes a split road surface processing of adjusting the braking force of the first wheel and the second wheel so that both of the slip values of the first wheel and the second wheel become less than or equal to the deceleration slip determination value while stopping an interchange of the first wheel and the second wheel and maintaining a state in which the braking force of the first wheel is larger than the braking force of the second wheel.

6. The vehicle braking control device according to claim 2, further comprising:

a slip value derivation unit that derives a slip value that is a value indicating a degree of deceleration slip of the wheel, wherein in the cross processing, when the slip value of the first wheel exceeds a deceleration slip determination value under a situation where the slip value of the second wheel is less than or equal to the deceleration slip determination value, the control unit switches between the first wheel and the second wheel.

7. The vehicle braking control device according to claim 2, further comprising:

a slip value derivation unit that derives a slip value that is a value indicating a degree of deceleration slip of the wheel, wherein during implementation of the anti-lock brake control, when the slip value of the second wheel exceeds a deceleration slip determination value under a situation where the slip value of the first wheel is less than or equal to the deceleration slip determination value, the control unit ends the cross processing, and executes a split road surface processing of adjusting the braking force of the first wheel and the second wheel so that both of the slip values of the first wheel and the second wheel become less than or equal to the deceleration slip determination value while stopping an interchange of the first wheel and the second wheel and maintaining a state in which the braking force of the first wheel is larger than the braking force of the second wheel.

* * * * *